2,701,800

Patented Feb. 8, 1955

2,701,800

PRODUCTION OF DIALKYL ACETAMIDO-(3-INDOLYLMETHYL)-MALONATE

Edgar C. Britton and John C. Vander Weele, Midland, Mich., assignors to The Dow Chemical Company, Midland, Mich., a corporation of Delaware No Drawing. Application May 17, 1951,
Serial No. 226,958

5 Claims. (Cl. 260—319)

This invention concerns an improved method for the manufacture of dialkyl acetamido-(3-indolylmethyl) malonates having the formula:

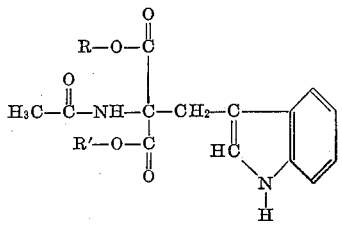

wherein R and R' represent alkyl radicals, especially lower alkyl radicals containing from 1 to 4 carbon atoms. It pertains particularly to an improved method for the production of diethyl acetamido-(3-indolylmethyl) malonate.

It is known that diethyl acetamido-(3-indolylmethyl) malonate can be prepared by: (1) reacting acrolein with diethyl alpha-acetamido-malonate to form diethyl alpha-acetamido-(alpha-2-formylethyl) malonate, (2) condensing the latter with phenylhydrazine to form a corresponding phenylhydrazone, and (3) heating this phenylhydrazone with aqueous sulphuric acid. However, the methods heretofore employed in carrying out this series of reactions are time consuming and inconvenient, in that they involve a considerable number of steps and operations, and are not well adapted to commercial practice. For instance, Moe et al., in U. S. Patent No. 2,516,332, carry out the first two of such reactions at temperatures of about 50° C. or below in the presence of ethyl alcohol or benzene as a reaction medium, preferably isolate the phenylhydrazone that is formed in the second reaction, redissolve the purified hydrazone in ethyl alcohol, add concentrated sulphuric acid, and heat the mixture under reflux to form the diethyl acetamido-(3-indolylmethyl) malonate which is crystallized from the mixture. The patent teaches that the three successive reactions can be carried out without isolation of the intermediate phenylhydrazone, but that the yield is lower when this is done. The steps of isolating and redissolving the intermediate phenylhydrazone are time-consuming and involve use of larger amounts of solvent (ethyl alcohol) than would otherwise be required.

We have found that by employing a liquid nuclear chlorinated aromatic hydrocarbon, e. g. chlorobenzene, ortho-dichlorobenzene, or a mixture thereof, as a medium in carrying out the aforementioned reactions and conducting the successive reactions in such medium without separation of the aldehyde and phenylhydrazone intermediate products, a dialkyl acetamido-(3-indolylmethyl) malonate may be obtained in a yield as high, or somewhat higher, and in a form of as high a purity as that obtainable under similar reaction conditions, except that the intermediate phenylhydrazone is isolated prior to use in the last of the aforementioned reactions. In this respect, the results obtained by the method of the invention are opposite to those reported in the aforementioned patent.

We have further found that the liquid nuclear chlorinated aromatic hydrocarbons, when employed as media for the reactions, permit all of the aforementioned reactions to be carried out rapidly, e. g. in less than one day, and permit the dialkyl acetamido-(3-indolylmethyl) malonate product to be crystallized directly from the reacted mixture, and thus be recovered in good yield and in a form of good purity.

The method of the invention differs from the aforementioned known methods in requiring employment of one or more liquid nuclear chlorinated aromatic hydrocarbons as the reaction medium; in omitting the usual steps of isolating an intermediate product without causing a resulting decrease in the yield or purity of the final product; in carrying out the last of the aforementioned reactions at temperatures somewhat higher than are usually employed; and in permitting the synthesis of a dialkyl acetamido-(3-indolylmethyl) malonate to be accomplished more rapidly, conveniently and economically than has heretofore been possible.

Except for the requirement that at least one liquid nuclear chlorinated aromatic hydrocarbon be employed as a reaction medium, the first two of the aforementioned reactions may be carried out in usual ways. The reaction between acrolein and dialkyl alpha-acetamido-malonate is carried out at between 15° and 50° C., preferably between 20° and 35° C. in the presence of an alkaline catalyst using a liquid, nuclear chlorinated aromatic hydrocarbon such as monochlorobenzene, ortho-dichlorobenzene, ortho-chlorotoluene, or alpha-chloronaphthalene, or a mixture of two or more of such chlorinated hydrocarbons, as a reaction medium. The two reactants are preferably employed in approximately equimolecular proportions, but either reactant may be used in a small excess, e. g. from 1 to 1.3 molecular equivalents of either reactant may be employed per mole of the other. As the catalyst for the reaction, any strong alkali such as aqueous sodium hydroxide, aqueous potassium hydroxide, sodium methylate, sodium ethylate, sodium propionate, potassium methylate, or potassium ethylate, etc. may be employed. The catalyst may be used in proportions ranging from a mere trace to the molecular equivalent of the dialkyl acetamidomalonate, but is usually employed in amount corresponding to from 0.02 to 0.1 of the molecular equivalent of the dialkyl acetamidomalonate. The liquid chlorinated aromatic hydrocarbon is usually employed in amount corresponding to from 1 to 3 times the combined weight of the two reactants, but it may be used in smaller or larger proportions. It should be present in amount sufficient to dissolve, or form a slurry of, the reactants to obtain a mixture which is sufficiently thin to permit rapid stirring.

In carrying out the reaction, the catalyst and the dialkyl acetamido-malonate are admixed with sufficient of the chlorinated aromatic hydrocarbon solvent, e. g. chlorobenzene, to dissolve or form a thin slurry of, the dialkyl acetamidomalonate, and the acrolein is added gradually with stirring. This order of mixing may be reversed, if desired, i. e. the mixture of dialkyl acetamidomalonate, catalyst and solvent may be added with stirring to the acrolein. Regardless of the order in which the starting materials are brought together, the rate of mixing should be such as to avoid spontaneous heating of the mixture, due to the heat of the reaction, to temperatures above 50° C. Usually, the reaction vessel is cooled during mixing of the reactants and the reaction is carried out at temperatures in the order of from 20° to 35° C. The mixture is preferably stirred for from 1 to 3 hours after mixing the starting materials so as to assure substantial completion of the reaction.

Phenylhydrazine is added directly to the alkaline mixture. It is preferably in amount corresponding approximately to the molecular equivalent of the dialkyl acetamidomalonate starting material, but may be added in somewhat smaller or larger proportions if desired. The mixture is preferably warmed, e. g. to from 60° to 100° C., so as to obtain fairly rapid consumption of the phenylhydrazine, but the reaction can be accomplished at lower temperatures. The reaction to form a phenylhydrazone of a dialkyl alpha - acetamido - alpha - (2 - formylethyl) malonate usually is substantially complete after one hour of heating at temperatures of from 70° to 80° C.

The mixture is then treated with sulphuric acid in an amount (exceeding that necessary to neutralize the alkaline catalyst) corresponding to from 1 to 3 molecular equivalents of sulphuric acid per mole of the dialkyl acetamidomalonate starting material and with sufficient water to form, with the acid, an aqueous sulphuric acid solution of from 3 to 15, preferably from 4 to 8, per cent concentration by weight. The acid and water may be added separately, but are preferably premixed and added in the form of an aqueous sulphuric acid solution. It is important that the acid be employed in proportions within the limits just stated, since use of smaller or larger amounts of the acid results in a decrease in yield of the desired dialkyl alpha-acetamido-alpha-(3-indolylmethyl) malonate, or in discoloration of the latter. After adding the aqueous acid, the mixture is heated with stirring at temperatures of from 85° to 100° C. usually for from 5 to 10 hours, whereby the dialkyl acetamido-(3-indolylmethyl) malonate is formed. It is important that the mixture be heated at temperatures within the range just stated throughout a major part of the reaction period, since employment of lower or higher reaction temperatures results in a decrease in the yield of the product.

The mixture is then permitted to settle into layers. The organic layer is separated and cooled to crystallize the product which is removed in usual ways, e. g. by filtration. The crystalline product is washed free of adhering mother liquor and dried.

The method as just described, permits production of a substantially pure dialkyl alpha-acetamido-alpha-(3-indolylmethyl) malonate in an overall yield of 60 per cent of theoretical or higher.

The following examples describe ways in which the invention has been practiced and illustrate certain of its advantages. They are not to be construed as limiting the invention.

Example 1

A sodium ethylate solution, formed by dissolving 30 grams of metallic sodium in 500 cc. of 95 per cent ethyl alcohol, was admixed with 43.4 pounds of diethyl alpha-acetamidomalonate and 8 gallons of chlorobenzene. To the mixture there was added, gradually and with stirring, a solution of 12 pounds of acrolein and 2 gallons of chlorobenzene. The acrolein solution was added in a period of 45 minutes and the mixture was maintained at temperatures between 25° and 35° C. during the addition. Thereafter, the mixture was stirred and maintained at temperatures of from 25° to 35° C. for 2 hours. Approximately 21.6 pounds of phenylhydrazine was then added and the mixture was stirred and heated to 75° C. for one hour. There were then added 40 pounds of sulphuric acid of 96 per cent concentration and 70 gallons of water. The resultant mixture was stirred and heated at 90° C. for 7 hours, then cooled to 75° C. and permitted to settle into layers. The organic layer was separated and cooled to about 10° C., whereby the product was crystallized. The mixture was centrifuged to separate the crystalline material and the latter was washed with chlorobenzene and dried. There was obtained 43 pounds of crystalline diethyl acetamido - (3 - indolylmethyl) malonate of light buff color and having a melting point of from 157° to 160° C. The yield was 62.2 per cent of theoretical, based on the starting materials employed.

Example 2

A sodium ethylate solution, formed by dissolving 60 grams of metallic sodium in 500 cc. of 95 per cent ethyl alcohol, was admixed with 43.4 pounds of diethyl alpha-acetamidomalonate and 8 gallons of chlorobenzene. To the mixture there was added, gradually and with stirring, a solution of 12 pounds of acrolein and 2 gallons of chlorobenzene. The acrolein solution was added in a period of 45 minutes and the mixture was maintained at temperatures between 25° and 35° C. during the addition. Thereafter, the mixture was stirred and maintained at temperatures of from 25° to 35° C. for 2 hours. Approximately 21.0 pounds of phenylhydrazine was added and the mixture was stirred, while at a temperature of about 25° C., for two hours. It was then heated, with continued stirring, at 75° C. for one hour. There were then added 30 pounds of sulphuric acid of 96 per cent concentration and 70 gallons of water. The resultant mixture was stirred and heated at 90° C. for 7 hours, then cooled to 75° C. and permitted to settle into layers. The organic layer was separated and cooled to about 10° C., whereby the product was crystallized. The mixture was centrifuged to separate the crystalline material and the latter was washed with chlorobenzene and dried. There was obtained 46 pounds of substantially pure crystalline diethyl acetamido-(3-indolylmethyl) malonate of light buff color. The yield was 66.5 per cent of theoretical, based on the starting materials employed.

Example 3

This example illustrates the results obtained by practice similar to that of the invention, except for isolating the phenylhydrazone of diethyl acetamido-(2-formylethyl) malonate which is formed as an intermediate product prior to converting it to the desired diethyl acetamido-(3-indolylmethyl) malonate final product. A mixture of 1.25 grams of sodium hydroxide and 0.75 cc. of water was added to a slurry of 217 grams of diethyl alpha-acetamidomalonate and 330 cc. of chlorobenzene. To the mixture there was added, over a period of 30 minutes, a solution of 56 grams of acrolein and 70 cc. of chlorobenzene. The mixture was stirred and maintained at 30° C. during the addition and for 30 minutes thereafter. The mixture was then heated to 70° C. and 110 grams of phenylhydrazine was added. The mixture was next stirred and heated at 80° C. for one hour. It was then cooled for several hours to crystallize the diethyl acetamido-(2-formylethyl) malonate phenylhydrazone product, and the latter was separated by filtration, washed with cold chlorobenzene, and dried. The yield of the crystalline phenylhydrazone product was 85.7 per cent of theoretical, based on the starting materials. Approximately 91 grams of the phenylhydrazone of diethyl acetamido-(2-formylethyl) malonate was admixed with 90 cc. of chlorobenzene and 1 liter of a 1-normal aqueous sulphuric acid solution. The mixture was stirred and boiled under reflux for 6 hours and then permitted to settle into layers. The organic layer of the hot mixture was separated. It was concentrated by heating the same under vacuum until crystallization was started. The organic layer was then cooled to about 10° C. for several hours to complete the crystallization. The crystalline material was removed by filtration, washed with cold chlorobenzene, and dried. There was obtained 59.5 grams of crystalline diethyl acetamido-(3-indolylmethyl) malonate having a melting point of from 158° to 160° C. The yield was 68.8 per cent of theoretical, based on the phenylhydrazone of diethyl acetamido-(2-formylethyl) malonate which was employed in this stage of the process. The overall yield of the diethyl acetamido-(3-indolylmethyl) malonate from the combustion of the foregoing steps was approximately 59 per cent of theoretical, based on the diethyl acetamidomalonate employed as a starting material.

The procedure of Example 1 may be modified to obtain other dialkyl acetamido-(3-indolylmethyl) malonates. For instance, by employing dimethyl acetamidomalonate, instead of diethyl acetamidomalonate, as a starting material, dimethyl acetamido-(3-indolylmethyl) malonate is obtained as the product. Similarly, by using dipropyl acetamidomalonate as a starting material, dipropyl acetamido-(3-indolylmethyl) malonate is obtained; and by employing dibutyl acetamidomalonate as a starting material, dibutyl acetamido-(3-indolylmethyl) malonate is produced. In place of chlorobenzene, other liquid, nuclear chlorinated aromatic hydrocarbons such as ortho-dichlorobenzene, ortho-chlorotoluene, or a mixture of chlorobenzene and ortho-dichlorobenzene may be used as a medium for the reactions involved in the process.

Other modes of applying the principle of the invention may be employed instead of those explained, change being made as regards the method herein disclosed, provided the steps stated by any of the following claims, or the equivalent of such stated steps, be employed.

We therefore particularly point out and distinctly claim as our invention:

1. In a method wherein: (1) acrolein is reacted with a dialkyl ester of alpha-acetamido-malonic acid, containing from 1 to 4 carbon atoms in each of its alkyl radicals, in the presence of an alkaline catalyst to form a corresponding dialkyl alpha acetamido-(2-formylethyl) malonate, (2) the latter is condensed with phenylhydrazine to form a corresponding phenylhydrazone, and (3) said phenylhydrazone is heated with sulphuric acid to form a dialkyl alpha acetamido-(3-indolylmethyl) malonate, containing from 1 to 4 carbon atoms in each alkyl radical of the molecule, the improvements which consist in carrying out the first two of these consecutive reactions in a liquid nuclear chlorinated aromatic hydrocarbon selected from the group consisting of at least one of the compounds chlorobenzene, ortho-dichlorobenzene and ortho-chlorotoluene as a reaction medium and adding, directly to the resultant mixture, sulphuric acid in an amount, in excess of that required to neutralize the alkaline catalyst, corresponding to from 1 to 3 molecular equivalents of sulphuric acid per mole of the dialkyl alpha acetamidomalonate starting material and sufficient water to form with the sulphuric acid an aqueous sulphuric acid solution of from 3 to 15 weight per cent concentration, and heating the mixture thus formed at a reaction temperature between 85° and 100° C., all three of the reactions being carried out in a liquid nuclear chlorinated aromatic hydrocarbon selected from the group consisting of at least one of the compounds chlorobenzene, ortho-dichlorobenzene and ortho-chlorotoluene as a reaction medium without isolation of the intermediate products that are formed.

2. A method, as claimed in claim 1, wherein the dialkyl acetamido-(3-indolylmethyl) malonate is crystallized from the organic layer of the mixture resulting from the last of the three reactions.

3. A method, as claimed in claim 1, wherein the dialkyl acetamidomalonate starting material is diethyl acetamidomalonate.

4. A method, as claimed in claim 1, wherein the dialkyl acetamidomalonate starting material is diethyl acetamidomalonate and diethyl acetamido-(3-indolylmethyl) malonate is crystallized from the organic layer of the mixture resulting from the last of the three reactions.

5. In a method for making a dialkyl alpha-acetamido-(3-indolylmethyl) malonate, containing from 1 to 4 carbon atoms in each alkyl radical of the molecule, the steps of forming a mixture of the phenylhydrazone of a dialkyl alpha-acetamido-(2-formylethyl) malonate, containing from 1 to 4 carbon atoms in each alkyl radical of the molecule and sufficient of a liquid nuclear chlorinated aromatic hydrocarbon selected from the group consisting of at least one of the compounds chlorobenzene, ortho-dichlorobenzene and ortho-chlorotoluene to permit rapid stirring of the mixture, acidifying the mixture with an aqueous sulfuric acid solution of from 3 to 15 weight per cent concentration, and heating the resulting mixture, with agitation, at a reaction temperature between 85° and 100° C.

References Cited in the file of this patent

UNITED STATES PATENTS

| | | |
|---|---|---|
| 2,516,332 | Moe et al. | July 25, 1950 |
| 2,566,992 | Morgan | Sept. 4, 1951 |